US012773728B2

(12) United States Patent
Gan et al.

(10) Patent No.: US 12,773,728 B2
(45) Date of Patent: Oct. 27, 2026

(54) OBJECT SINTERING PREDICTIONS

(71) Applicant: Peridot Print LLC, Palo Alto, CA (US)

(72) Inventors: Chuang Gan, Shanghai (CN); Jun Zeng, Palo Alto, CA (US); Lei Chen, Shanghai (CN); Zi-Jiang Yang, Shanghai (CN); Yu Xu, Shanghai (CN); Carlos Alberto Lopez Collier De La Marliere, Guadalajara (MX); Juheon Lee, Palo Alto, CA (US)

(73) Assignee: Peridot Print LLC, Palo Alto, CA (US)

( * ) Notice: Subject to any disclaimer, the term of this patent is extended or adjusted under 35 U.S.C. 154(b) by 290 days.

(21) Appl. No.: 18/578,582

(22) PCT Filed: Jul. 16, 2021

(86) PCT No.: PCT/US2021/041969
§ 371 (c)(1),
(2) Date: Jan. 11, 2024

(87) PCT Pub. No.: WO2023/287430
PCT Pub. Date: Jan. 19, 2023

(65) Prior Publication Data
US 2024/0293867 A1 Sep. 5, 2024

(51) Int. Cl.
*B22F 10/80* (2021.01)
*B33Y 50/00* (2015.01)

(52) U.S. Cl.
CPC ............... *B22F 10/80* (2021.01); *B33Y 50/00* (2014.12)

(58) Field of Classification Search
CPC .......... B22F 10/14; B22F 10/80; B22F 10/85; B22F 2998/10; B22F 3/10; B33Y 50/00; B33Y 50/02; Y02P 10/25
See application file for complete search history.

(56) References Cited

U.S. PATENT DOCUMENTS 9,676,145 B2 6/2017 Buller et al.
10,921,782 B2 2/2021 Mehr et al.
2017/0100891 A1 4/2017 Meisner et al.
(Continued)

FOREIGN PATENT DOCUMENTS

WO 2018/217903 A1 11/2018

OTHER PUBLICATIONS

De Editors, "Editor's Pick: New Simulation Software Tackles Sintering in Additive Manufacturing, 2020", Digital Engineering, https://www.digitalengineering247.com/article/editors-pick-new-simulation-software-tackles-sintering-in-additive-manufacturing, Nov. 18, 2020, 7 pages.
(Continued)

*Primary Examiner* — Kidest Worku
(74) *Attorney, Agent, or Firm* — Law Offices of Michael Dryja; Michael Dryja

(57) ABSTRACT

Examples of methods are described herein. In some examples, a method includes determining a graph representation of a three-dimensional (3D) object based on a voxel representation of the 3D object. In some examples, the graph representation includes nodes corresponding to voxels of the voxel representation and edges associated with the nodes. In some examples, the method includes predicting, using a machine learning model, a sintering state of the 3D object based on the graph representation.

18 Claims, 4 Drawing Sheets

(56) References Cited

U.S. PATENT DOCUMENTS

| | | | |
|---|---|---|---|
| 2017/0372480 | A1* | 12/2017 | Anand .................... G06F 30/20 |
| 2018/0006897 | A1* | 1/2018 | Kanza ................. G06F 16/2455 |
| 2018/0314235 | A1 | 11/2018 | Mirabella et al. |
| 2019/0251449 | A1* | 8/2019 | Dai ........................ G06N 3/084 |
| 2019/0346830 | A1 | 11/2019 | De Souza Borges Ferreira et al. |
| 2020/0353675 | A1* | 11/2020 | Wattyn .................. B29C 64/241 |
| 2020/0353678 | A1* | 11/2020 | Yeoh ..................... B29C 70/388 |
| 2021/0009163 | A1* | 1/2021 | Urtasun ................... G06N 3/04 |

OTHER PUBLICATIONS

Ha et al., "Analysis of Shape Deformation from Densification of Additive Manufacturing Parts in Selective Laser Sintering", International Journal of Precision Engineering and Manufacturing, May 20, 2020, vol. 21, pp. 1571-1580.

* cited by examiner

OBJECT SINTERING PREDICTIONS

BACKGROUND

Three-dimensional (3D) solid parts may be produced from a digital model using additive manufacturing. Additive manufacturing may be used in rapid prototyping, mold generation, mold master generation, and short-run manufacturing. Additive manufacturing involves the application of successive layers of build material. This is unlike some machining processes that often remove material to create the final part. In some additive manufacturing techniques, the build material may be cured or fused.

DETAILED DESCRIPTION

Figure 1:
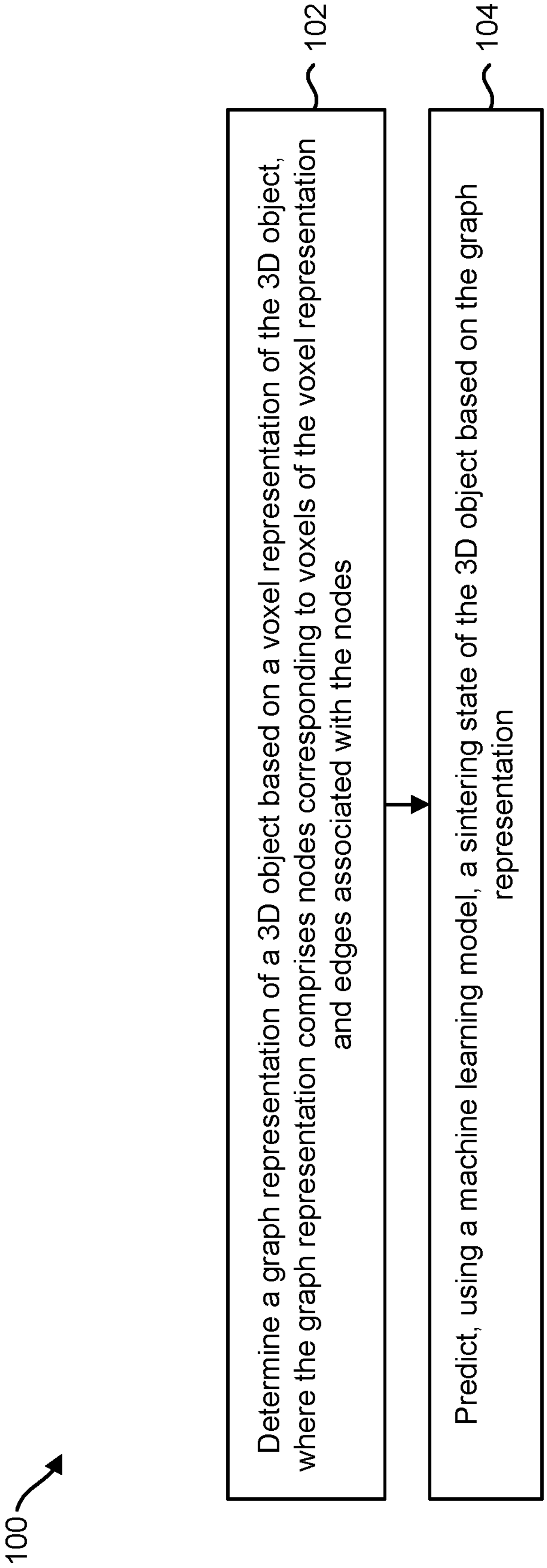
FIG. 1 is a flow diagram illustrating an example of a method for object sintering predictions.

Additive manufacturing may be used to manufacture three-dimensional (3D) objects. 3D printing is an example of additive manufacturing. Metal printing (e.g., metal binding printing, binder jet, Metal Jet Fusion, etc.) is an example of 3D printing. In some examples, metal powder may be glued at certain voxels. A voxel is a representation of a location in a 3D space (e.g., a component of a 3D space). For instance, a voxel may represent a volume that is a subset of the 3D space. In some examples, voxels may be arranged on a 3D grid. For instance, a voxel may be cuboid or rectangular prismatic in shape. In some examples, voxels in the 3D space may be uniformly sized or non-uniformly sized. Examples of a voxel size dimension may include 25.4 millimeters (mm)/150≈170 microns for 150 dots per inch (dpi), 490 microns for 50 dpi, 2 mm, 4 mm, etc. The term "voxel level" and variations thereof may refer to a resolution, scale, or density corresponding to voxel size.

Some examples of the techniques described herein may be utilized for various examples of additive manufacturing. For instance, some examples may be utilized for metal printing. Some metal printing techniques may be powder-based and driven by powder gluing and/or sintering. Some examples of the approaches described herein may be applied to area-based powder bed metal printing, such as binder jet, Metal Jet Fusion, and/or metal binding printing, etc. Some examples of the approaches described herein may be applied to additive manufacturing where an agent or agents (e.g., latex) carried by droplets are utilized for voxel-level powder binding.

In some examples, metal printing may include two phases. In a first phase, the printer (e.g., print head, carriage, agent dispenser, and/or nozzle, etc.) may apply an agent or agents (e.g., binding agent, glue, latex, etc.) to loose metal powder layer-by-layer to produce a glued precursor (or "green") object. A precursor object is a mass of metal powder and adhesive. In a second phase, a precursor object may be sintered (e.g., heated) to produce an end object. For example, the glued precursor object may be placed in a furnace or oven to be sintered to produce the end object.

Sintering may cause the metal powder to fuse, and/or may cause the agent to be burned off. An end object is an object formed from a manufacturing procedure or procedures. In some examples, an end object may undergo a further manufacturing procedure or procedures (e.g., support removal, polishing, assembly, painting, finishing, etc.). A precursor object may have an approximate shape of an end object.

The two phases of some examples of metal printing may present challenges in controlling the shape (e.g., geometry) of the end object. For example, the application (e.g., injection) of agent(s) (e.g., glue, latex, etc.) may lead to porosity in the precursor part, which may significantly influence the shape of the end object. In some examples, metal powder fusion (e.g., fusion of metal particles) may be separated from a layer-by-layer printing procedure, which may limit control over sintering and/or fusion.

In some examples, metal sintering may be performed in approaches for metal injection molded (MIM) objects and/or binder jet (e.g., MetJet). In some cases, metal sintering may introduce a deformation and/or change in an object varying from 25% to 50% depending on precursor object porosity. A factor or factors causing the deformation (e.g., visco-plasticity, sintering pressure, yield surface parameters, yield stress, and/or gravitational sag, etc.) may be captured and applied for shape deformation simulation. Some approaches for metal sintering simulation may provide science-driven simulation based on first principle sintering physics. For instance, factors including thermal profile and/or yield curve may be utilized to simulate object deformation due to shrinkage and/or sagging, etc. In some approaches, metal sintering simulation may provide science driven prediction of an object deformation and/or compensation for the deformation. Some simulation approaches may provide relatively high accuracy results at a voxel level for a variety of geometries (e.g., from less to more complex geometries). Due to computational complexity, some examples of physics-based simulation engines may take a relatively long period to complete a simulation. For instance, simulating transient and dynamic sintering of an object may take from tens of minutes to several hours depending on object size. In some examples, larger object sizes may increase simulation runtime. For example, a 12.5 centimeter (cm) object may take 218.4 minutes to complete a simulation run. Some examples of physics-based simulation engines may utilize relatively small increments (e.g., time periods) in simulation to manage the nonlinearity that arises from the sintering physics. Accordingly, it may be helpful to reduce simulation time.

Some examples of the techniques described herein may utilize a machine learning model or models. Machine learning is a technique where a machine learning model is trained to perform a task or tasks based on a set of examples (e.g., data). Training a machine learning model may include determining weights corresponding to structures of the machine learning model. Artificial neural networks are a kind of machine learning model that are structured with nodes, model layers, and/or connections. Deep learning is a kind of machine learning that utilizes multiple layers. A deep neural network is a neural network that utilizes deep learning.

Examples of neural networks include convolutional neural networks (CNNs) (e.g., basic CNN, deconvolutional neural network, inception module, residual neural network, etc.), recurrent neural networks (RNNs) (e.g., basic RNN, multi-layer RNN, bi-directional RNN, fused RNN, clockwork RNN, etc.), graph neural networks (GNNs), etc. Different depths of a neural network or neural networks may be utilized in accordance with some examples of the techniques described herein.

In some examples of the techniques described herein, a deep neural network may predict or infer a sintering state. A sintering state is data representing a state of an object in a sintering procedure. For instance, a sintering state may indicate a characteristic or characteristics of the object at a time during the sintering procedure. In some examples, a sintering state may indicate a physical value or values associated with a voxel or voxels of an object. Examples of a characteristic(s) that may be indicated by a sintering state may include displacement, porosity, a displacement rate of change, a velocity, an acceleration, etc. Displacement is an amount of movement (e.g., distance) for all or a portion (e.g., voxel(s)) of an object. For instance, displacement may indicate an amount and/or direction that a part of an object has moved during sintering over a time period (e.g., since beginning a sintering procedure). Displacement may be expressed as a displacement vector or vectors at a voxel level. Porosity is a proportion of empty volume or unoccupied volume for all or a portion (e.g., voxel(s)) of an object. A displacement rate of change is a rate of change (e.g., velocity) of displacement for all or a portion (e.g., voxel(s)) of an object. An acceleration (e.g., displacement acceleration) is a rate of change of a velocity.

In some examples, simulating and/or predicting sintering states may be performed in a voxel space. A voxel space is a plurality of voxels. In some examples, a voxel space may represent a build volume and/or a sintering volume. A build volume is a 3D space for object manufacturing. For example, a build volume may represent a cuboid space in which an apparatus (e.g., computer, 3D printer, etc.) may deposit material (e.g., metal powder, metal particles, etc.) and agent(s) (e.g., glue, latex, etc.) to manufacture an object (e.g., precursor object). In some examples, an apparatus may progressively fill a build volume layer-by-layer with material and agent during manufacturing. A sintering volume may represent a 3D space for object sintering (e.g., oven). For instance, a precursor object may be placed in a sintering volume for sintering. In some examples, a voxel space may be expressed in coordinates. For example, locations in a voxel space may be expressed in three coordinates: x (e.g., width), y (e.g., length), and z (e.g., height).

In some examples, a sintering state may indicate a displacement in a voxel space. For instance, a sintering state may indicate a displacement (e.g., displacement vector(s), displacement field(s), etc.) in voxel units and/or coordinates. In some examples, a sintering state may indicate a position of a point or points of the object at a second time, where the point or points of the object at the second time correspond to a point or points of the object at the first time (and/or at a time previous to the first time). A displacement vector may indicate a distance and/or direction of movement of a point of the object over time. For instance, a displacement vector may be determined as a difference (e.g., subtraction) between positions of a point over time (in a voxel space, for instance).

In some examples, a sintering state may indicate a displacement rate of change (e.g., displacement "velocity"). For instance, a machine learning model may produce a sintering state that indicates the rate of change of the displacements. For example, a machine learning model (e.g., deep learning model for inferencing) may predict a displacement velocity for an increment (e.g., prediction increment).

In some examples, a sintering state may indicate a velocity rate of change (e.g., displacement "acceleration"). For instance, a machine learning model may produce a sintering state that indicates the rate of change of the displacement velocity. For example, a machine learning model (e.g., deep learning model for inferencing) may predict a displacement acceleration for an increment (e.g., prediction increment).

A sintering stage is a period during a sintering procedure. For example, a sintering procedure may include multiple sintering stages (e.g., 2, 3, 4, etc., sintering stages). In some examples, each sintering stage may correspond to different circumstances (e.g., different temperatures, different heating patterns, different periods during the sintering procedure, etc.). For instance, sintering dynamics at different temperatures and/or sintering stages may have different deformation rates. A machine learning model or models (e.g., deep learning models) may be trained to predict a sintering state in a sintering procedure.

A time period in a sintering procedure may be referred to as an increment or time increment. A time period spanned in a prediction (by a machine learning model or models, for instance) may be referred to as a prediction increment. For example, a deep neural network may infer a sintering state at a second time based on a sintering state (e.g., displacement) at a first time, where the second time is subsequent to the first time. A time period spanned in simulation may be referred to as a simulation increment. In some examples, a prediction increment may be different from (e.g., greater than) a simulation increment. In some examples, a prediction increment may be an integer multiple of a simulation increment. For instance, a prediction increment may span and/or replace many simulation increments.

In some examples, a prediction of a sintering state at a second time may be based on a simulated sintering state at a first time. For instance, a simulated sintering state at the first time may be utilized as input to a machine learning model to predict a sintering state at the second time. Predicting a sintering state using a machine learning model may be performed more quickly than simulating a sintering state. For example, predicting a sintering state at the second time may be performed in less than a second, which may be faster than determining the sintering state at the second time through simulation. For instance, a relatively large number of simulation increments may be utilized, and each simulation increment may take a quantity of time to complete. For instance, a simulation may advance in simulation increments of dt. A machine learning model (e.g., neural network) may produce a prediction covering multiple simulation increments (e.g., 10*dt, 100*dt, etc.). Utilizing prediction (e.g., machine learning, inferencing, etc.) to replace some simulation increments may enable determining a sintering state in less time (e.g., more quickly). For example, utilizing machine learning (e.g., a deep learning inferencing engine) in conjunction with simulation may allow larger (e.g., ×10) increments (e.g., prediction increments) to increase processing speed while preserving accuracy.

Some examples of the techniques described herein may be performed in an offline loop. An offline loop is a procedure that is performed independent of (e.g., before) manufacturing, without manufacturing the object, and/or without measuring (e.g., scanning) the manufactured object.

Some examples of the techniques described herein may utilize a machine learning model (e.g., GNN) to provide a quantitative model that can learn a physics simulation process and deliver prediction with increased speed. The machine learning model may directly infer the sintered state of an object (e.g., deformation, displacement vectors at voxel level, and other physical fields associated with voxels, for example, porosity, strain, and/or stress) at a time T(t=2), when given the sintering state of the object at time T(t=1), where T(t=1)<T(t=2). In some examples, prediction may be performed for a time increment. In some examples, prediction may be performed for more than one (e.g., input T(t=1), T(t=2)) increments to predict later sintering states T(t=n).

In some examples, the machine learning model may infer the sintered state after T(t=2). For instance, the machine learning model may predict sintered states at T(t=3), T(t=4), . . . , T(t=k) with a given sintering state of the object at T(t=1), where k is a quantity of increments in the sintering procedure. In some examples, k may be greater than 10, 20, 30, 50, or more with model training to cover the entire sintering procedure. In some examples, for prediction at subsequent increment, the machine learning model may utilize the given sintering state of the object at T(t=1), and may recursively use the predicted states (e.g., predicted sintering states for T(t=2), T(t=3), etc., to predict the subsequent sintering states).

In some examples of the techniques described herein, a machine learning model may use the sintering state (e.g., simulated sintering state) at T(t=1) as input to predict the sintering state at T(t=2) in reduced time (e.g., less than a second). In some examples, the machine learning model predicts subsequent (e.g., rollout) sintering states at T(t=3), T(t=4), . . . , to T(t=k) in approximately 10 seconds or less depending on the input geometry size. Some examples of the techniques described herein may determine sintering states in less time than pure simulation that uses a relatively large number of time increments, where each time increment may take a quantity of time to complete. For instance, inferencing may be utilized to replace simulation increments, which may reduce computation time.

Throughout the drawings, identical reference numbers may or may not designate similar or identical elements. Similar numbers may or may not indicate similar elements. When an element is referred to without a reference number, this may refer to the element generally, with or without limitation to any particular drawing or figure. The drawings may or may not be to scale, and the size of some parts may be exaggerated to more clearly illustrate the example shown. Moreover, the drawings provide examples in accordance with the description. However, the description is not limited to the examples provided in the drawings.

FIG. 1 is a flow diagram illustrating an example of a method 100 for object sintering predictions. The method 100 and/or an element or elements of the method 100 may be performed by an apparatus (e.g., electronic device). For example, the method 100 may be performed by the apparatus 302 described in relation to FIG. 3.

The apparatus may determine 102 a graph representation of a 3D object based on a voxel representation of the 3D object, where the graph representation comprises nodes corresponding to voxels of the voxel representation and edges associated with the nodes. An object model is a geometrical model of an object. For instance, an object model may be a 3D model representing the 3D object. Examples of object models include computer-aided design (CAD) models, mesh models, 3D surfaces, etc. An object model may be expressed as a set of points, surfaces, faces, vertices, etc. In some examples, an object model may be represented in a file (e.g., STL, OBJ, 3MF, etc., file). In some examples, the apparatus may receive an object model from another device (e.g., linked device, networked device, removable storage, etc.) or may generate the 3D object model. In some examples, the apparatus may generate the voxel representation of the 3D object or may receive the voxel representation of the 3D object from another device. For example, the apparatus may voxelize a 3D object model to produce the voxel representation of the 3D object. For instance, the apparatus may convert the 3D object model into voxels representing the object. The voxels may represent portions (e.g., rectangular prismatic subsets and/or cubical subsets) of the object in 3D space.

A graph representation is data indicating a structure of nodes and edges. A graph representation may represent the 3D object. For instance, nodes of the graph data may correspond to voxels of the object and/or may represent voxels of the 3D object. In some examples, edges of the graph representation may represent interactions between nodes (e.g., voxel-to-voxel interactions). For instance, the graph representation may indicate metal voxel interactions. In some examples, the graph representation may indicate a graph (e.g., nodes and edges) at a time (e.g., increment) of a sintering procedure. In some examples, a graph may include another factor or factors. For example, the graph representation may include a global factor. For instance, a graph may include a global temperature at a time (e.g., increment) of the sintering procedure. In some examples, each node may include an attribute or attributes. For instance, a node may indicate a displacement of a voxel, velocity of a voxel, acceleration of a voxel, and/or distance(s) of the node to a boundary or boundaries (e.g., upper boundary, lower boundary, side boundary, etc.). For example, a node may include a vector indicating velocity in three dimensions (e.g., x, y, z). For instance, a node may indicate a displacement velocity for a voxel. In some examples, a node attribute value or values may be normalized. In some examples, a node may include a series of vectors for a quantity of increments (e.g., velocities for the last three increments). In some examples, a sintering state may be expressed as a graph or graph representation. An example of a graph representation (e.g., graph) is given in FIG. 2.

In some examples, a graph may be denoted G(V,E). For instance, G may denote a graph at a specific sintering increment. V may represent nodes and E may represent edges between nodes. For instance, an edge may be a connection between two nodes that represents the interaction(s) between the two nodes. In some examples, edges may represent interactions among metal voxels. In some examples, each edge may include an attribute or attributes. Examples of edge attributes may include normalized relative edge length (e.g., edge length/radius r, where r may be described as given below). In some examples, a graph may be denoted G(V,E,U), where U may represent a global factor or factors of the entire graph. For instance, U may denote temperature at a time increment in some examples. In some examples, U may denote gravity. There may be multiple graphs with variations of nodes and/or edges (e.g., variations of node attributes and/or edge attributes), where each graph corresponds to a time increment.

In some examples, the apparatus may determine nodes (e.g., V) from voxels. For example, determining the graph representation may include filtering voxel vertices to produce the nodes. For instance, to convert voxel data at each increment to produce a graph (e.g., G(V,E,U)) the apparatus may filter the voxel vertices to produce nodes. In some examples of voxelized object data, each voxel may be a cuboid with 8 vertices. Neighboring voxels may share some vertices, which may result in duplicate nodes if all vertices were read as nodes. The apparatus may filter out duplicated vertices shared by adjacent voxels to determine unique vertices, which may be converted to nodes.

In some examples, unique nodes (e.g., all unique nodes) may be utilized to produce a graph. In some examples with larger part geometry and/or voxelization, keeping all unique nodes may produce a relatively large number of nodes from the filtered vertices. For instance, an example object model may result in 20,000 nodes, while other object models may produce a much larger quantity of nodes. In some examples, sampling nodes at a lower density (e.g., resolution) may help to reduce training time, inferencing time, and/or graph determination time for large object models. For instance, sampling may be performed by reading the node for a subset of voxels (e.g., every b neighboring voxels, where b is a resolution scale). In some examples, after obtaining a predicted sintering state (e.g., predicted graph, predicted displacement vectors for the sampled graph, etc.) the apparatus may interpolate the predicted results to produce a displacement vector for more nodes (e.g., all nodes). Examples of interpolation that may be utilized may include bilinear interpolation, bicubic interpolation, or bilinear interpolation with weighted coefficient values, etc. In some examples, a different resolution scale or different resample approaches may be performed on different geometries. For instance, relatively low resolution may be utilized for a geometry with less deformation and a relatively high resolution may be utilized to sample more complex geometries (e.g., edge portions, high curvature portions, etc.) where rapid deformation may occur.

In some examples, determining 102 the graph representation may include determining a node attribute value or values for each of the nodes. For instance, each node in the graph may have a set of attributes. A node attribute is a characteristic or feature corresponding to a node. A node attribute value is a quantity or metric of the node attribute. Examples of node attributes may include position (e.g., displacement), velocity, acceleration, global temperature, node mobility, etc. In some examples, a set of node attributes for a node n may be in the form of $[\widehat{s'_{i-2}}, \widehat{s'_{i-1}}, \widehat{s'_i}, T_i]^T$, where $\widehat{s'_{i-2}}$, $\widehat{s'_{i-1}}$, and $\widehat{s'_i}$ are velocities of the last three time increments for node n, $T_i$ denotes a temperature (e.g., global temperature), and i denotes a time increment (e.g., current time increment). In some examples, each $\widehat{s'_i}$ is a 3D vector indicating velocity in three dimensions (e.g., x, y, and z).

In some examples, p normalized initial velocity vectors for p time increments may be utilized as node attributes, representing the moving speed of each node. In the foregoing example, p=3. Other values for p (e.g., p=2, p=6, etc.) may be utilized in other examples. Sintering physics may have an intrinsic memory effect. For instance, a current sintering state has a dependency on previous sintering state history. In some examples, other physics-inspired parameters may be utilized as node attributes, such as node accelerations. In some examples, node position, velocity, and/or acceleration vectors of each increment may be calculated by taking a time differentiation based on initial position data and initial deformation data. In some examples, other node attributes may be identified and quantitively appended to the set of node attributes, such as mechanical properties at the node location.

In some examples, the apparatus may simulate sintering of voxels of the 3D object to produce a quantity of initial simulated sintering states. For example, the apparatus may utilize a physics engine to produce a quantity of initial simulated sintering states. The initial simulated sintering states may be utilized to determine a node attribute or attributes. For instance, the initial simulated sintering states may indicate the velocities (e.g., $\widehat{s'_{i-2}}$, $\widehat{s'_{i-1}}$, $\widehat{s'_i}$,) for the node attributes of the graph representation. In some examples, the sintering states may be simulated for the entire sintering procedure for training. In some examples, during runtime (e.g., inferencing, model deployment, etc.) initial sintering states may be simulated without simulating some subsequent sintering states of the sintering procedure.

In some examples, a node attribute value may indicate node mobility. Node mobility may be a quantity indicating permitted node movement. For example, node mobility may indicate whether a node is free to move (e.g., move with all degrees of freedom), whether a node is fixed (e.g., immobile), whether a node can move within a given plane, whether a node can move normal (e.g., perpendicular) to a given plane, whether a node can move within a given line, etc.

In some examples, the node mobility attribute may be utilized to apply boundary constraints. In some examples of a sintering procedure, some nodes may not freely move due to external constraints. For example, a node that is in contact with a support (e.g., support surface and/or other support structure(s)) may not move through the support. In some examples, a boundary constraint may express and/or represent a boundary condition in a sintering procedure. While examples are provided herein for nodes exposed at an object surface, the node mobility attribute may be utilized to constrain a node inside of an object for scenarios where an internal node is physically constrained.

In some examples, a sintering procedure (e.g., actual sintering and/or sintering physics simulation) may include physics constraints that may be quantitively included and/or described with a machine learning model (e.g., deep learning model). For example, a printed precursor object may be placed on a platform during sintering. The bottom surface of the precursor object may not change in z-direction displacement. Some voxels may experience a constraint or constraints, which may be encoded in a machine learning model. Voxels that experience a constraint may be located, and nodes corresponding to the voxels may include a node attribute indicating the constraint.

In some examples, a constraint may be indicated with a node attribute that differentiates different types of the nodes. For instance, a node on a bottom plane (e.g., support platform) that does not change in z-dimension displacement and may change in another direction (e.g., in x and/or y dimensions) may be referred to as a "slip" node. A "fixed" node may be a node that does not change displacement in x, y, or z dimensions. A "free" node may be a node that may change displacement in x, y, and/or z dimensions. In some examples, the node mobility attribute in a set of node attributes may indicate a corresponding node type.

In some examples, the node mobility attribute value may be expressed as a scalar value. For instance, "0" may indicate a fixed node, "1" may indicate a slip node (e.g., a node on a bottom plane), and "2" may indicate a free node. In some examples, the node mobility attribute may be denoted m. For instance, a set of node attributes may be expressed as $[\widehat{s'_{i-2}}, \widehat{s'_{i-1}}, \widehat{s'_i}, m]^T$, where m is the node mobility attribute expressed as a scalar value.

In some examples, the node mobility attribute value may be expressed as a one-hot vector. For instance, a fixed node may be expressed as [0,0,0], indicating no displacement change in three dimensions. A slip node may be expressed as [1, 1, 0], indicating no displacement change in the z-dimension. A free node may be expressed as [1, 1, 1], indicating potential displacement change for three dimensions. For instance, a set of node attributes may be expressed as $[\widehat{s_{i-2}^{t}}, \widehat{s_{i-1}^{t}}, \widehat{s_{i}^{t}}, \hat{m}]^T$, where $\hat{m}$ is the node mobility attribute expressed as a one-hot vector. In some examples, the apparatus may detect the node type based on node location (e.g., corresponding voxel location). For instance, the apparatus may detect nodes situated on a bottom plane or in a corner and may append the corresponding mobility attribute value to the set of node attributes. During training, a machine learning model may learn to differentiate the different node types, which may represent the sintering boundary condition.

In some examples, temperature may be utilized as a node attribute. For instance, a node attribute value may indicate a temperature in Celsius (C) or Fahrenheit (° F.). Temperature may be a driving source of part deformation during sintering. In some examples, temperature (e.g., global temperature) corresponding to a time increment may be utilized as a node attribute in a graph for each respective time increment. For instance, $T_i$ may denote a sintering temperature at a current time increment. For a graph or graphs at a time increment, $T_i$ may be utilized as a node attribute. In some examples, $T_i$ may be a global factor that is universal to all nodes within the same graph. In some examples, all sets of node attributes for all metal voxels in the graph at a time increment may share the same $T_i$ (e.g., a global factor value). For instance, a set of node attributes may be expressed as $[\widehat{s_{i-2}^{t}}, \widehat{s_{i-1}^{t}}, \widehat{s_{i}^{t}}, T_i]_T$, where $T_i$ is a global factor for all nodes in a graph.

In some examples, temperature may be a driving source of object deformation during sintering. In some examples, the temperature value may be utilized at different increments as a global feature corresponding to each increment's graph. For instance, for each graph at an increment, the global feature may be added uniformly to all nodes in the graph. With a global temperature, at each training increment, the machine learning model may learn the impact of different temperature values to the deformation rate. For example, a deformation rate at a temperature of 240 degrees Celsius may be relatively small compared to a deformation rate at a temperature of 840 degrees Celsius. Utilizing the temperature information may help the machine learning model to account for the temperature impact and learn the weights at different sintering stages automatically.

In some examples, other physics-inspired parameters that are not spatially dependent may be utilized as global attributes. For instance, gravitational acceleration may be utilized as a global attribute. For example, a set of node attributes may be expressed as $[\widehat{s_{i-2}^{t}}, \widehat{s_{i-1}^{t}}, \widehat{s_{i}^{t}}, T_i, g_i]^T$, where $g_i$ is the gravitational acceleration.

In some examples, determining 102 a graph representation may include determining the edges. For instance, the apparatus may generate edges (e.g., E) that connect nodes. In some examples, the apparatus may determine neighbors of each node to build a connected graph. In some examples, determining the graph representation may include determining the edges based on a threshold distance. For instance, the threshold distance may be a radius r from the current node. Nodes within the threshold distance (e.g., r) may be determined as neighbors to a node, and the apparatus may generate edges between the node and the neighboring nodes. In some examples, the set of node attributes may include a set of neighboring nodes. For instance, a node attribute may be a list of neighboring nodes.

In some examples, the apparatus may use a k-d tree to find neighbors of each node within a radius r. The apparatus may generate directed edges among nodes within the radius r. For example, utilizing initial position data of a node, the apparatus may form a k-d tree (e.g., k-d tree data structure). A binary search tree may be one example of a k-d tree where datapoints are partitioned into less or greater than a current value. In some examples, a k-d tree utilized herein may be applied to an arbitrary number of dimensions. For instance, the apparatus may evaluate datapoints (e.g., nodes) in the k-d tree structure at a single dimension at a time and may partition nodes by splitting on the median value. The apparatus may search for and identify neighboring nodes within the radius r in the k-d tree.

In some examples, a node (e.g., node Vi) may be set as a "sender" of a directed edge to each neighboring node. Nodes within the radius r may be included as "receivers" of directed edges from the node. The length of radius r may be adjusted based on voxel size and use case. In some examples, the radius r may be 1.2 times voxel size, such that each internal node has 6 neighboring nodes as receivers. The radius r may be adjusted for accuracy, computational workload, and/or modeled physics.

In some examples, for any directed edge from a first node to a second node, the apparatus may generate a directed edge from the second node to the first node. For example, the apparatus may determine a bi-directional graph to reflect the sintering physics of a metal voxel that interacts with connected voxels (e.g., receives an interaction from a connected voxel and/or sends an interaction to a connected voxel). In some examples, the apparatus determines a bidirectional edge or edges (e.g., a sender and/or receiver list) for a node or nodes in the graph by setting each node as a "sender" and determining corresponding "receivers." The bidirectional edges may utilize bidirectional data passing to reflect sintering physics.

In some examples, the edges may be maintained among the nodes. For instance, the edges may be maintained from an initial edge determination based on initially determining neighboring nodes at an initial time increment.

In some examples, the apparatus may update the graph representation over a time increment of a sintering procedure. For example, the graph structure may change at different increments of a sintering procedure. For instance, the number of edges among nodes (indicating the dynamics of node interactions) may change. In some examples, a node attribute value may change (indicating a change of displacement for the corresponding node, for instance). In some examples, an edge attribute value may change (indicating a change of stress of the corresponding edge, for instance).

In some examples, the apparatus may adjust edges dynamically to reflect topological changes. For instance, the apparatus may dynamically adjust edges (e.g., sender and/or receiver relationship) over the sintering procedure (e.g., time increments). In some examples, with each metal voxel deforming at a different rate and scale, the neighboring nodes (e.g., nearest neighboring nodes) of a sender node may change. To model the dynamics of neighboring nodes, the apparatus may determine an updated sender and/or receiver list at each time increment or iteratively based on other timing measures. For example, the apparatus may update the graph nodes' positions at the time increment (updated by most recent displacement vectors, for instance), form the k-d tree, and query the nodes' new neighbors (e.g., nearest nodes) within the threshold distance (e.g., radius r)

again in the updated graph. By updating the edges (e.g., sender and/or receiver list) at different time increments, the apparatus may provide dynamic edge adjustment in case of topological change (e.g., when two previously separate faces contact each other). In some examples, the apparatus may predict, using the machine learning model, a second sintering state of the 3D object based on the updated graph representation. For instance, the apparatus my recursively utilize updated graph representations to predict further sintering states for subsequent increments.

In some examples, determining 102 a graph representation may include determining an edge attribute value for each of the edges. For instance, each edge in the graph may have a set of attributes. An edge attribute is a characteristic or feature corresponding to an edge. An edge attribute value is a quantity or metric of the edge attribute. Examples of edge attributes may include position displacements, distances among nodes, stress, strain, normalized relative edge length, etc.

In some examples, p (e.g., p=2, p=3, p=6, etc.) normalized recent position displacements and distances among nodes may be utilized as edge attributes. In some examples, other physics-inspired parameters may be utilized as edge attributes. For example, strain and stress may be utilized as edge attributes. An example of a graph representation is given in FIG. 2.

The apparatus may predict 104, using a machine learning model, a sintering state of the 3D object based on the graph representation. For instance, the machine learning model may predict the sintering state (e.g., a graph) based on a previous sintering state (e.g., a graph indicating a sintering state at a previous increment). In some examples, the first machine learning model is a GNN. A GNN is a neural network that operates on graph data.

In some examples, the machine learning model may be trained using training data from a training simulation or simulations. The machine learning model may be trained previous to being used to predict 104 the sintering state (at inferencing time). To train the machine learning model, the apparatus or another device may voxelize a 3D object model to produce voxels. In some examples, the apparatus or another device may simulate sintering of the voxels to produce simulated sintering states. For example, a physics engine may be utilized to produce the simulated sintering states. A physics engine is hardware (e.g., circuitry) or a combination of instructions and hardware (e.g., a processor with instructions) to simulate a physical phenomenon or phenomena. In some examples, the physics engine may simulate material (e.g., metal) sintering. For example, the physics engine may simulate physical phenomena on an object (e.g., object model) over time (e.g., during sintering). The simulation may indicate deformation effects (e.g., shrinkage, sagging, etc.). In some examples, the physics engine may simulate sintering using a finite element analysis (FEA) approach.

Some examples of the physics engine may utilize a time-marching approach. Starting at an initial time, the physics engine may simulate and/or process a simulation increment (e.g., a period of time, dt, etc.). In some examples, the simulation increment may be indicated by received input. For instance, the apparatus may receive an input from a user indicating the simulation increment. In some examples, the simulation increment may be selected randomly, may be selected from a range, and/or may be selected empirically.

In some examples, the physics engine may utilize trial displacements. A trial displacement is an estimate of a displacement that may occur during sintering. Trial displacements may be produced by a machine learning model and/or with another function (e.g., random selection and/or displacement estimating function, etc.). The trial displacements (e.g., trial displacement field) may trigger imbalances of the forces involved in the sintering process. In some examples, the physics simulation engine may include and/or utilize an iterative optimization technique to iteratively re-shape displacements initialized by the trial displacements such that force equilibrium is achieved. In some examples, the physics simulation engine may produce a displacement field (e.g., equilibrium displacement field that may be denoted) as a sintering state at a simulation increment. In some examples, the simulation may be carried out over a sintering procedure (e.g., over simulation increments for an entire sintering procedure).

In some examples, the machine learning model may be a sequential model. For example, the machine learning model may be trained to predict the sintering state of a next increment $t=t0+1$ based on previous L sintering states from previous times ($t=t0-L, t0-L+1, \ldots, t0$). For an arbitrary start state index idx, based on L sintering states ($t=idx, t=idx+1, t=idx+2, \ldots, t=idx+L$), the machine learning model may predict a next sintering state $t=idx+L+1$. In some examples, L may be an adjustable parameter. For instance, examples of L may include L=1 L=2, L=3, L=4, L=5, L=6, etc.

To train the machine learning model, the sintering states simulated based on the voxels may be converted into graphs (e.g., an array of G(V,E)). Each graph (e.g., each element in the array) may represent the sintering state at one increment. The graphs (e.g., the array of G(V,E)) may be separated into graphs corresponding to past time increments (e.g., the past history of G(V,E) from $t0-\alpha$ to t0), and a ground truth graph (e.g., G(V,E) at t0+1). In some examples, for training, the graph generation may form multiple past time increments and ground truth pairs. (e.g., the past history of G(V, E) from $t\beta-\alpha$ to $t\beta$, and a ground truth graph G(V, E) at $t\beta+1$, where $\beta$ may be an arbitrary number (e.g., 2-6 or another number). Smaller a values may result in faster acceleration.

The sintering history may be split into windows of length w+2 (e.g., length w+1 for the machine learning model input, and one increment for machine learning model ground truth). Accordingly, multiple split windows may be utilized as training samples for the sintering history of one portion of the sintering procedure. For example, for a sintering history of 200 increments, with a splitting window length=7, 6 sintering states (e.g., sintering states at 6 increments) may be utilized for input data and 1 sintering state (e.g., a sintering state at an increment) may be utilized for a ground truth for training. In this example, approximately 28 samples may be utilized for training (e.g., 200/7) if there is no overlap in the samples. In some examples, w is a flexible parameter, where a smaller w may be utilized to reduce computational complexity.

After training, the graph representation of the initial simulated sintering states may be utilized as the input of the machine learning model to predict 104 a sintering state. At inference time, for instance, the machine learning model may utilize a graph including node attributes indicating velocities from previous increments (e.g., from initial simulated increments or previously predicted increments). For example, a physics engine may produce a quantity of initial simulated sintering states by repeating operations for a quantity of simulation increments. The quantity of initial simulated sintering states may be limited. For instance, the physics engine may produce a quantity of initial simulated sintering states over a portion of the sintering procedure. Examples of the quantity of initial simulated sintering states may include 1, 2, 3, etc., initial simulated sintering states. In some examples, for runtime (e.g., inferencing and/or deployment), the trained machine learning model may utilize one past history G(V,E) set, from t0−α to t0, to predict subsequent graphs. In some examples, a time (e.g., increment) for starting the prediction (e.g., a time for getting the data corresponding to t0−1 to t0 from the simulation) may be selected.

In some examples, a limited quantity of sintering states (e.g., 1, 2, etc.) may be utilized as input for each call for the trained machine learning model. The machine learning model may produce a predicted sintering state corresponding to a later time increment (e.g., 50). In some examples, the apparatus may perform a simulation based on the predicted sintering state at the later time increment (e.g., 50), which may produce a simulated sintering state with increased accuracy. At another iteration (e.g., increment 50 or another increment quantity n), the trained machine learning model may be called again and may predict another later increment (e.g., 50+current increment or n+current increment). In some examples, the simulation and prediction cycle may be repeated until the sintering procedure is completed.

Initially, the trained machine learning model (e.g., GNN) may predict 104 a sintering state using a graph representation from the initial simulation increments. In some examples, an element or elements of the method 100 may recur, may be repeated, and/or may be iterated. For instance, the apparatus may predict a subsequent sintering state or states. In some examples, the sintering state may be expressed as a graph representation and/or may be used to update the graph representation. In some examples, the apparatus may perform a subsequent prediction using the machine learning model to predict a subsequent sintering state. For example, the predicted sintering state output by the machine learning model may be used to produce a next graph representation for a next increment. The machine learning model may utilize the next graph representation to produce the next sintering state.

In some examples, after getting a predicted output (e.g., predicted sintering state) from the machine learning model, the apparatus may feed the predicted output back into the physics engine. For instance, the physics engine may utilize the predicted output as a trial displacement or displacements that may trigger force imbalances to iteratively reshape trial displacements (e.g., DO). As described herein, a force equilibrium may be achieved, and the physics simulation engine may be utilized to compute an equilibrium displacement field (e.g., De). In some examples, the method 100 may include repeating (e.g., recursively performing) sintering state simulation and sintering state prediction.

Some examples of the techniques described herein may provide a machine learning model architecture that reflects physical interactions. In some examples, the architecture may include an encoder, graph processor, and decoder. The encoder may convert object data to latent graph data (e.g., G(V,E)). The graph processor may compute interactions among nodes, aggregate information, and/or output learned latent features. The graph processor may include an interaction networks engine. The interaction networks engine may utilize a previous increment's features to update edge attributes. The interaction networks engine may utilize a previous set of node attributes and the updated edge attributes to update node attributes. The interaction networks engine may utilize previous node attributes, edge attributes, and node attributes to update a global attribute or attributes. In some examples, multilayer perceptron (MLP) may be utilized for each update function. The weights and parameters of each MLP may be learned during training. In some examples, multiple rounds of calculations may be performed, where each round may be referred to as one "message passing" round, representing the interaction among nodes through edges. The number of message passing rounds (e.g., 10 or another quantity) may vary depending on training. Prediction accuracy may increase with more message passing rounds, since more message passing rounds may represent larger node interaction scope with a trade-off to longer training.

In some examples, a graph representation may be utilized by multiple machine learning models (e.g., GNNs) to predict subsequent sintering states. For instance, different machine learning models corresponding to different sintering stages may be utilized. In some examples, the predicted sintering states produced by the different machine learning models may be fused and/or one of the predicted sintering states may be selected.

In some examples, operation(s), function(s), and/or element(s) of the method 100 may be omitted and/or combined. In some examples, the method 100 may include one, some, or all of the operation(s), function(s), and/or element(s) described in relation to FIG. 2, FIG. 3, and/or FIG. 4.

Figure 2:
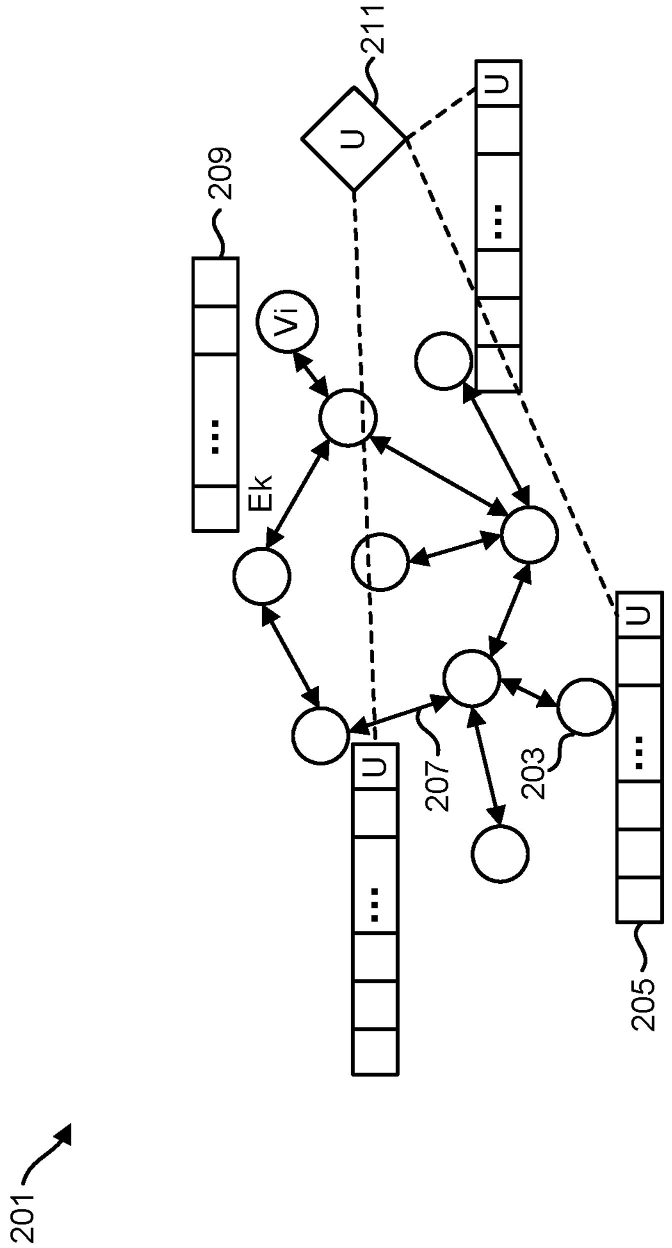
FIG. 2 is a diagram illustrating an example of a graph representation at a time increment in accordance with some of the techniques described herein.

FIG. 2 is a diagram illustrating an example of a graph representation 201 at a time increment in accordance with some of the techniques described herein. For example, the graph representation 201 includes nodes 203 illustrated as circles. Each of the nodes 203 may include a corresponding set of node attributes 205. The graph representation 201 includes edges 207 illustrated as lines. Each of the edges 207 may include a corresponding set of edge attributes 209. In the example of the FIG. 2, the graph representation 201 includes global attributes 211 (e.g., temperature).

In some examples, the graph representation 201 may be determined based on a voxel representation as described in relation to FIG. 1. The graph representation 201 may represent and/or indicate a sintering state of an object at a time increment. In some examples, a machine learning model may utilize the graph representation 201 to predict a subsequent sintering state.

Figure 3:
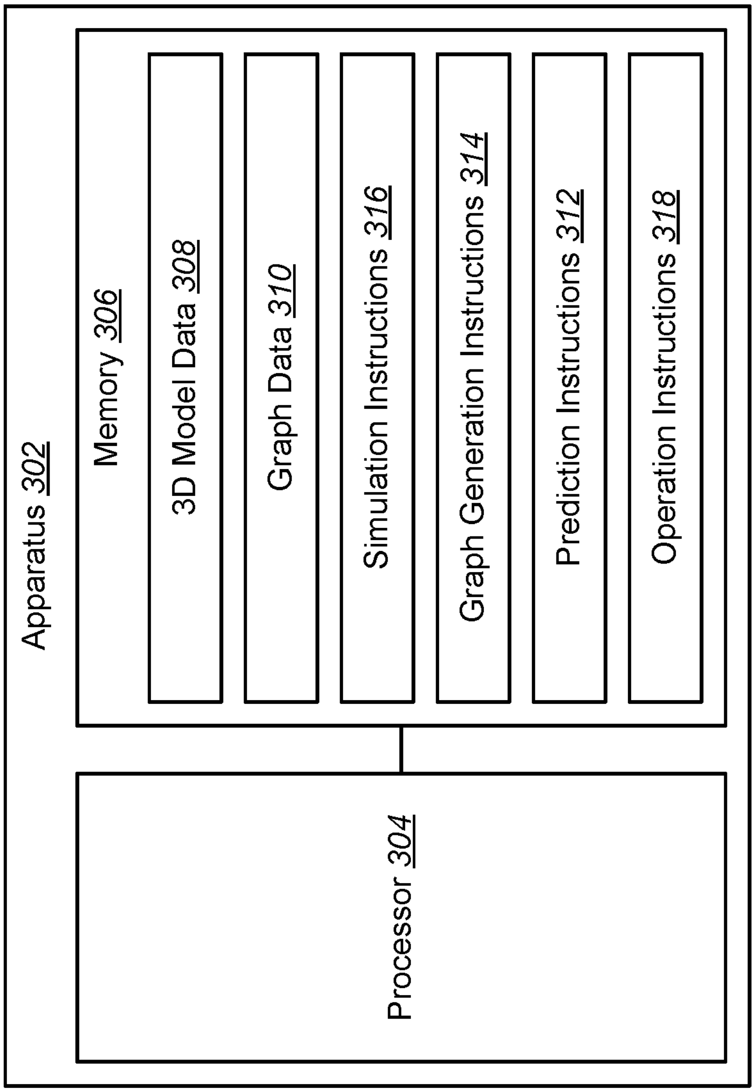
FIG. 3 is a block diagram of an example of an apparatus that may be used in object sintering predictions.

FIG. 3 is a block diagram of an example of an apparatus 302 that may be used in object sintering predictions. The apparatus 302 may be a computing device, such as a personal computer, a server computer, a printer, a 3D printer, a smartphone, a tablet computer, a smart appliance, etc. The apparatus 302 may include and/or may be coupled to a processor 304 and/or a memory 306. The memory 306 may be in electronic communication with the processor 304. For instance, the processor 304 may write to and/or read from the memory 306. In some examples, the apparatus 302 may be in communication with (e.g., coupled to, have a communication link with) an additive manufacturing device (e.g., a 3D printing device). In some examples, the apparatus 302 may be an example of a 3D printing device. The apparatus 302 may include additional components (not shown) and/or some of the components described herein may be removed and/or modified without departing from the scope of this disclosure.

The processor 304 may be any of a central processing unit (CPU), a semiconductor-based microprocessor, graphics processing unit (GPU), field-programmable gate array (FPGA), an application-specific integrated circuit (ASIC), and/or other hardware device suitable for retrieval and execution of instructions stored in the memory 306. The processor 304 may fetch, decode, and/or execute instructions (e.g., prediction instructions 312) stored in the memory 306. In some examples, the processor 304 may include an electronic circuit or circuits that include electronic components for performing a functionality or functionalities of the instructions (e.g., prediction instructions 312). In some examples, the processor 304 may perform one, some, or all of the functions, operations, elements, methods, etc., described in relation to one, some, or all of FIGS. 1-4.

The memory 306 may be any electronic, magnetic, optical, and/or other physical storage device that contains or stores electronic information (e.g., instructions and/or data). Thus, the memory 306 may be, for example, Random Access Memory (RAM), Electrically Erasable Programmable Read-Only Memory (EEPROM), a storage device, an optical disc, and/or the like. In some implementations, the memory 306 may be a non-transitory tangible machine-readable storage medium, where the term "non-transitory" does not encompass transitory propagating signals.

In some examples, the apparatus 302 may also include a data store (not shown) on which the processor 304 may store information. The data store may be volatile and/or non-volatile memory, such as Dynamic Random Access Memory (DRAM), EEPROM, magnetoresistive random-access memory (MRAM), phase change RAM (PCRAM), memristor, flash memory, and the like. In some examples, the memory 306 may be included in the data store. In some examples, the memory 306 may be separate from the data store. In some approaches, the data store may store similar instructions and/or data as that stored by the memory 306. For example, the data store may be non-volatile memory and the memory 306 may be volatile memory.

In some examples, the apparatus 302 may include an input/output interface (not shown) through which the processor 304 may communicate with an external device or devices (not shown), for instance, to receive and store the information pertaining to the object(s) for which a sintering state or states may be determined. The input/output interface may include hardware and/or machine-readable instructions to enable the processor 304 to communicate with the external device or devices. The input/output interface may enable a wired or wireless connection to the external device or devices. In some examples, the input/output interface may further include a network interface card and/or may also include hardware and/or machine-readable instructions to enable the processor 304 to communicate with various input and/or output devices, such as a keyboard, a mouse, a display, another apparatus, electronic device, computing device, etc., through which a user may input instructions into the apparatus 302. In some examples, the apparatus 302 may receive 3D model data 308 from an external device or devices (e.g., computer, removable storage, network device, etc.).

In some examples, the memory 306 may store 3D model data 308. The 3D model data 308 may be generated by the apparatus 302 and/or received from another device. Some examples of 3D model data 308 include a 3D manufacturing format (3MF) file or files, a 3D computer-aided design (CAD) image, object shape data, mesh data, geometry data, etc. The 3D model data 308 may indicate the shape of an object or objects. In some examples, the 3D model data 308 may indicate a packing of a build volume, or the apparatus 302 may arrange 3D object models represented by the 3D model data 308 into a packing of a build volume. In some examples, the 3D model data 308 may be utilized to obtain slices of a 3D model or models. For example, the apparatus 302 may slice the model or models to produce slices, which may be stored in the memory 306. In some examples, the 3D model data 308 may be utilized to obtain an agent map or agent maps of a 3D model or models. For example, the apparatus 302 may utilize the slices to determine agent maps (e.g., voxels or pixels where agent(s) are to be applied), which may be stored in the memory 306.

In some examples, the memory 306 may store simulation instructions 316. The processor 304 may execute the simulation instructions 316 to simulate sintering of voxels to produce an initial simulated sintering state. In some examples, generating the initial simulated sintering state may be performed as described in relation to FIG. 1. For instance, the processor 304 may execute the simulation instructions 316 to simulate an initial simulated sintering state of a 3D object model represented by the 3D model data 308.

In some examples, the memory 306 may store graph generation instructions 314. The processor 304 may execute the graph generation instructions 314 to determine a graph based on the initial simulated sintering state, where the graph includes nodes and edges. For instance, the processor 304 may voxelize an object model to produce voxels of the object model and may determine a graph based on the voxels and the initial simulated sintering state. In some examples, determining the graph may be performed as described in relation to FIG. 1. The graph may be stored in the memory 306 as graph data 310. In some examples, each of the nodes may include an attribute value indicating a node type. For instance, each of the nodes may include an attribute value indicating whether the corresponding node is a free node, a slip node, or a fixed node.

The memory 306 may store prediction instructions 312. In some examples, the processor 304 may execute the prediction instructions 312 to predict a subsequent sintering state based on the graph. In some examples, predicting the subsequent sintering state may be performed as described in relation to FIG. 1. For instance, the processor 304 may utilize a machine learning model to infer the subsequent sintering state (e.g., displacement, displacement rate of change, velocity, etc.) for an object represented by the graph data 310.

In some examples, the processor 304 may predict the subsequent sintering state using a machine learning model trained with an anchoring loss. For instance, movement of the fixed nodes and/or slip nodes may be constrained by setting corresponding velocity or acceleration equal to 0 in a loss function (e.g., training objective function). With this loss function, the machine learning model may learn that some node types have 0 acceleration in a given dimension or dimensions (e.g., not moving in the given dimension(s)). An anchoring loss is a loss term relating to node motion constraints. For example, an anchoring loss (e.g., $L_{anchor}$) may be computed for fixed nodes and/or slip nodes in accordance with Equation (1).

$$L_{anchor} = L_{fix} + L_{slip} \quad (1)$$

In Equation (1), $L_{fix}$ is a summation of the acceleration or velocity loss term for the fixed nodes in the graph and $\|a_i - \hat{0}\|$ denotes constraining the predicted $a_i$ to a 0 vector. $L_{slip}$ is a summation of the acceleration or velocity loss term for the slip nodes in the graph and $\|z_i - 0\|$ denotes constraining the z-dimension value to 0 (without constraining other dimensions, for instance). In some examples, $L_{anchor}$ may be added as an additional constraint to the training objective function $L_D$. The training objective function may be utilized to train a machine learning model in accordance with some of the techniques described herein.

In some examples, $L_{fix}$ may be expressed in accordance with Equation (2).

$$L_{fix} = \sum_i \|a_i - \hat{0}\| \quad (2)$$

In some examples, $L_{slip}$ may be expressed in accordance with Equation (3).

$$L_{slip} = \sum_i \|z_i - 0\| \quad (3)$$

The memory 306 may store operation instructions 318. In some examples, the processor 304 may execute the operation instructions 318 to perform an operation based on the sintering state. For example, the apparatus 302 may present the sintering state and/or a value or values associated with the sintering state (e.g., deformation, maximum displacement, displacement direction, an image of the object model with a color coding showing the degree of displacement over the object model, etc.) on a display, may store the sintering state and/or associated data in memory 306, and/or may send the sintering state and/or associated data to another device or devices. In some examples, the apparatus 302 may determine whether a sintering state (e.g., last or final deformation) is within a tolerance (e.g., within a target amount of displacement). In some examples, the apparatus 302 may print a precursor object based on the object model if the sintering state is within the tolerance. For example, the apparatus 302 may print the precursor object based on two-dimensional (2D) maps or slices of the object model indicating placement of binder agent (e.g., glue). In some examples, the apparatus 302 (e.g., processor 304) may determine compensation based on a deformation indicated by the sintering state. For instance, the apparatus 302 (e.g., processor 304) may adjust the object model to compensate for the deformation (e.g., sag). For example, the object model may be adjusted in an opposite direction or directions from the displacement(s) indicated by the deformation.

Figure 4:
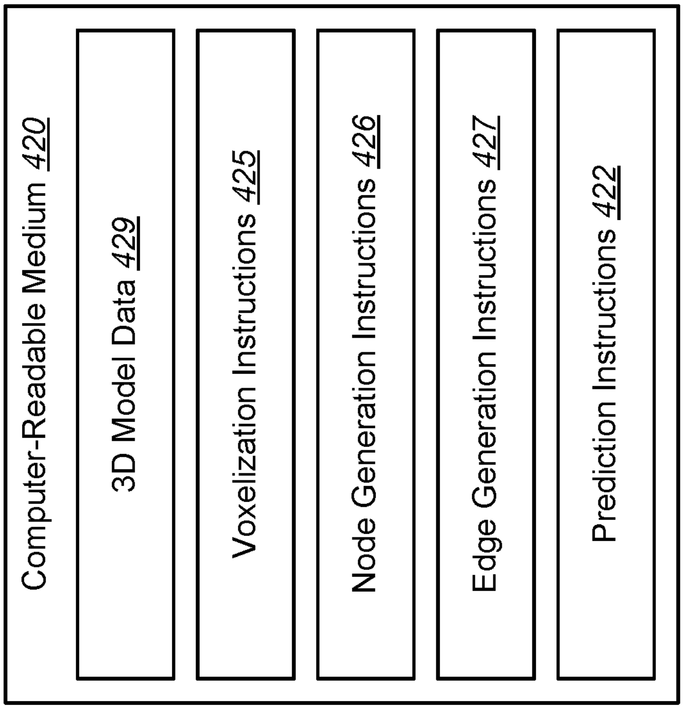
FIG. 4 is a block diagram illustrating an example of a computer-readable medium for object sintering predictions.

FIG. 4 is a block diagram illustrating an example of a computer-readable medium 420 for object sintering predictions. The computer-readable medium 420 may be a non-transitory, tangible computer-readable medium 420. The computer-readable medium 420 may be, for example, RAM, EEPROM, a storage device, an optical disc, and the like. In some examples, the computer-readable medium 420 may be volatile and/or non-volatile memory, such as DRAM, EEPROM, MRAM, PCRAM, memristor, flash memory, and/or the like. In some implementations, the memory 306 described in relation to FIG. 3 may be an example of the computer-readable medium 420 described in relation to FIG. 4.

The computer-readable medium 420 may include data (e.g., information, instructions, and/or executable code, etc.). For example, the computer-readable medium 420 may include 3D model data 429, voxelization instructions 425, node generation instructions 426, edge generation instructions 427, and/or prediction instructions 422.

In some examples, the computer-readable medium 420 may store 3D model data 429. Some examples of 3D model data 429 include a 3D CAD file, a 3D mesh, etc. The 3D model data 429 may indicate the shape of a 3D object or 3D objects (e.g., object model(s)).

In some examples, the voxelization instructions 425 are instructions when executed cause a processor of an electronic device to determine voxels representing a 3D object model. In some examples, determining the voxels may be performed as described in relation to FIG. 1 and/or FIG. 3. For instance, the processor may determine voxels based on a 3D object model represented by the 3D model data 429.

In some examples, the node generation instructions 426 are instructions when executed cause a processor of an electronic device to generate, based on voxels representing a 3D object model, a plurality of nodes of a first graph corresponding to a first time. In some examples, generating the plurality of nodes may be performed as described in relation to FIG. 1, FIG. 2, and/or FIG. 3.

In some examples, the node generation instructions 426 are instructions when executed cause a processor of an electronic device to determine a plurality of node attributes for the plurality of nodes. In some examples, generating the plurality of node attributes may be performed as described in relation to FIG. 1, FIG. 2, and/or FIG. 3.

In some examples, the edge generation instructions 427 are instructions when executed cause a processor of an electronic device to generate a plurality of edges of the first graph. In some examples, generating the plurality of edges may be performed as described in relation to FIG. 1, FIG. 2, and/or FIG. 3.

In some examples, the edge generation instructions 427 are instructions when executed cause a processor of an electronic device to determine a plurality of edge attributes for the plurality of edges. In some examples, generating the plurality of edge attributes may be performed as described in relation to FIG. 1, FIG. 2, and/or FIG. 3.

In some examples, the prediction instructions 422 are instructions when executed cause a processor of an electronic device to predict, using a graph neural network, a second graph based on the first graph, wherein the second graph indicates a sintering state corresponding to a second time (e.g., a subsequent time). In some examples, predicting the second graph may be performed as described in relation to FIG. 1, FIG. 2, and/or FIG. 3.

In some examples, the graph neural network may be trained based on a deformation loss and a stress loss. Strain and stress are physics factors in sintering kinetics. In a given sintering stage, the quantitative relationship between strain and stress may be described by an implicit function. In some examples, a neural network trained for multiple related tasks may perform better than a neural network trained for a single task.

In some examples, using the same neural network to predict the sintering deformation and sintering stress may increase prediction accuracy. In some examples, a stress tensor on each voxel may be encoded into a graph neural network or networks. For example, a stress tensor of each voxel may be converted into a vector and associated with a node corresponding to a vertex of a voxel. In some examples, a choice of vertices on the voxel may be unique, such as a vertex closest to an origin of a coordinate system. For joint training, a loss term (e.g., L) may be utilized to reduce the error of stress prediction. In some examples, the loss term may be expressed in accordance with Equation (4).

$$L = \lambda L_D + (1 - \lambda) L_S \quad (4)$$

In Equation (4), $L_D$ is a deformation loss term, $L_S$ is a stress loss term, and $\lambda \in [0,1]$ is a hyper parameter.

In some examples, the stress loss term may be expressed in accordance with Equation (5).

$$L_S = \sum_i \|v_i - \hat{v}_i\| \tag{5}$$

In Equation (5), $v_i$ and $v_i$ are the ground truth and the prediction of a stress vector with node i, respectively, and $\|v_i - \hat{v}_i\|$ denotes a Euclidean distance between $v_i$ and $v_i$.

In some examples, stress and strain rate may be correlated with component cracking during the sintering process. Accordingly, this joint prediction may be used for quality assessment of metal sintering.

In some examples, the graph neural network may be trained based on an anchoring loss. For example, a graph neural network may be trained based on an anchoring loss as described in relation to FIG. 3.

A training objective function may be utilized to train a machine learning model or models. In some examples, at time a time increment k, features with n increments may be utilized as the input X of a graph neural networks f. Accelerations or velocities with I increments may be utilized as the output Y of the graph neural networks f. The graph networks may directly or recurrently output the elements of Y. Examples of the output Y and the input X are denoted in Equation (6).

$$Y = [\hat{a}_{k+1}, \hat{a}_{k+2}, \hat{a}_{k+3}, \ldots, \hat{a}_{k+l}] \tag{6}$$
$$X = [s_{k-n}, \ldots, s_{k-2}, s_{k-1}, s_k, g]$$
$$Y = f_\theta(X)$$

Metal sintering is a complicated physics process. It may be difficult to predict long-term deformation without a large dataset. Instead of predicting one increment after time point k, some examples of the techniques described herein may predict I consecutive small increments. In some examples, I may be one increment or multiple increments. Multiple increments constrained in the training objective function may be utilized to help the graph neural networks to learn short-term and long-term dynamics of sintering. This may potentially alleviate overfitting of training and may reduce prediction time of rollout. In some examples, mean square error L(Y|X) may be utilized to enhance the graph neural networks and/or to add a discount factor in the loss, in which $a_{k+l}$ is a ground truth node acceleration or velocities vector, $\hat{a}_{k+1}$ is the network-predicted corresponding acceleration or velocity vector of the same node. A deformation loss term may be denoted $L_D$, which may be utilized in the objective function to differentiate from the additional loss constraints. In some examples, the mean square error may be defined in accordance with Equation (7).

$$L(Y \mid X) = (\hat{a}_{h+1} - a_{h+1})^2 + \gamma(\hat{a}_{h+2} - a_{h+2})^2 + \gamma^2(\hat{a}_{h+3} - a_{h+3})^2 + \ldots + \gamma^h(\hat{a}_{h+l} - a_{h+j})^2 \tag{7}$$

In Equation (7), h is a start prediction index and j is a quantity of predicted increments to be accounted for in a loss computation.

Some examples of the techniques described herein may utilize an architecture based on graph structures and a machine learning model that represents metal powder voxels as nodes, and edges to represent voxel-voxel interaction. Some examples of the techniques described herein may provide a physics-aware machine learning model with physics-informed constraints. The physics informed constraints may be utilized to learn different sintering stages and corresponding dominating deformation causes to make more accurate predictions based on physics causal factors.

While various examples of techniques are described herein, the techniques are not limited to the examples. Variations of the examples described herein may be implemented within the scope of the disclosure. For example, operations, functions, aspects, or elements of the examples described herein may be omitted or combined.

The invention claimed is:

1. A method comprising:

generating, by a processor and from an object model for a three-dimensional (3D) object, a voxel representation corresponding to a green version of the 3D object that is to be generated by an additive manufacturing process that comprises, on a layer-by-layer basis:

depositing a layer of build material powder; and selectively depositing binder agent on the layer based on where the build material powder is to be bound together in accordance with the object model, wherein after generation by the additive manufacturing process, the green version of the 3D object is to then be subjected to a sintering process to produce an end version of the 3D object;

determining, by the processor, an initial state of a graph representation of the 3D object based on the voxel representation, wherein the graph representation comprises nodes corresponding to voxels of the voxel representation and edges associated with the nodes, and wherein the initial state of the graph representation corresponds to the green version of the 3D object; and iteratively predicting, by the processor and using a machine learning model, an effect of sintering on the 3D object during at least a portion of the sintering process, by, for each of a plurality of time increments throughout the sintering process:

inputting a current state of the graph representation of the 3D object at a current time increment into the machine learning model, the current state representing the 3D object at the current time increment in the sintering process; and responsively receiving a next state of the graph representation of the 3D object at a next time increment from the machine learning model, the next state representing the 3D object at the next time increment in the sintering process.

2. The method of claim 1, wherein the graph representation further comprises a global factor.

3. The method of claim 1, wherein generating the graph representation comprises filtering voxel vertices to produce the nodes.

4. The method of claim 1, wherein generating the graph representation comprises determining a node attribute value for each of the nodes.

5. The method of claim 4, wherein the node attribute value indicates node mobility.

6. The method of claim 1, wherein generating the graph representation comprises determining the edges based on a threshold distance.

7. The method of claim 1, wherein generating the graph representation comprises determining an edge attribute value for each of the edges.

8. The method of claim 1, wherein for each time increment except for a last time increment, the next state of the graph representation of the 3D object serves as the current state of the graph representation of the 3D object for the next time increment.

9. The method of claim 1, wherein the next state of the graph representation of the 3D object generated in a last time increment corresponds to the end version of the 3D object at an end of the sintering process.

10. The method of claim 1, further comprising:

processing, by the processor, the initial state of the graph representation to perform a simulation of an initial part of the sintering process, wherein the processed initial state of the graph representation reflects a version of the 3D object after the initial part of the sintering process, and wherein iterative prediction of the effect of sintering on the 3D object starts with the processed initial state at a first time increment corresponding to a remainder of the sintering process after the initial part of the sintering process has occurred.

11. The method of claim 1, further comprising:

modifying the object model to compensate for deformations in the 3D object reflected in the iteratively predicted effect of sintering on the 3D object.

12. The method of claim 11, further comprising:

performing the additive manufacturing process in accordance with the modified object model to generate the green version of the 3D object; and subjecting the green version of the 3D object to the sintering process to produce the end version of the 3D object.

13. A non-transitory machine-readable storage medium storing instructions executable by a processor to perform processing comprising:

generating, from an object model for a three-dimensional (3D) object, a voxel representation corresponding to a green version of the 3D object that is to be generated by an additive manufacturing process that comprises, on a layer-by-layer basis:

depositing a layer of build material powder; and selectively depositing binder agent on the layer based on where the build material powder is to be bound together in accordance with the object model, wherein after generation by the additive manufacturing process, the green version of the 3D object is to then be subjected to a sintering process to produce an end version of the 3D object;

determining an initial state of a graph representation of the 3D object based on the voxel representation, wherein the graph representation comprises nodes corresponding to voxels of the voxel representation and edges associated with the nodes, and wherein the initial state of the graph representation corresponds to the green version of the 3D object; and iteratively predicting, using a machine learning model, an effect of sintering on the 3D object during at least a portion of the sintering process, by, for each of a plurality of time increments throughout the sintering process:

inputting a current state of the graph representation of the 3D object at a current time increment into the machine learning model, the current state representing the 3D object at the current time increment in the sintering process; and responsively receiving a next state of the graph representation of the 3D object at a next time increment from the machine learning model, the next state representing the 3D object at the next time increment in the sintering process.

14. The non-transitory machine-readable storage medium of claim 13, wherein for each time increment except for a last time increment, the next state of the graph representation of the 3D object serves as the current state of the graph representation of the 3D object for the next time increment.

15. The non-transitory machine-readable storage medium of claim 13, wherein the next state of the graph representation of the 3D object generated in a last time increment corresponds to the end version of the 3D object at an end of the sintering process.

16. The non-transitory machine-readable storage medium of claim 13, wherein the processing further comprises:

processing the initial state of the graph representation to perform a simulation of an initial part of the sintering process, wherein the processed initial state of the graph representation reflects a version of the 3D object after the initial part of the sintering process, and wherein iterative prediction of the effect of sintering on the 3D object starts with the processed initial state at a first time increment corresponding to a remainder of the sintering process after the initial part of the sintering process has occurred.

17. The non-transitory machine-readable storage medium of claim 13, wherein the processing further comprises:

modifying the object model to compensate for deformations in the 3D object reflected in the iteratively predicted effect of sintering on the 3D object.

18. The non-transitory machine-readable storage medium of claim 17, wherein the additive manufacturing process is actually performed in accordance with the modified object model to generate the green version of the 3D object, and wherein the green version of the 3D object is actually subjected to the sintering process to produce the end version of the 3D object.

* * * * *